July 14, 1953   RODOLPHE CHRISTIAN HAENNY   2,645,251
ALSO KNOWN AS
RODOLF CHRISTIAN HÄNNI
HARNESS FRAME FOR LOOMS
Filed Feb. 21, 1948   5 Sheets-Sheet 1
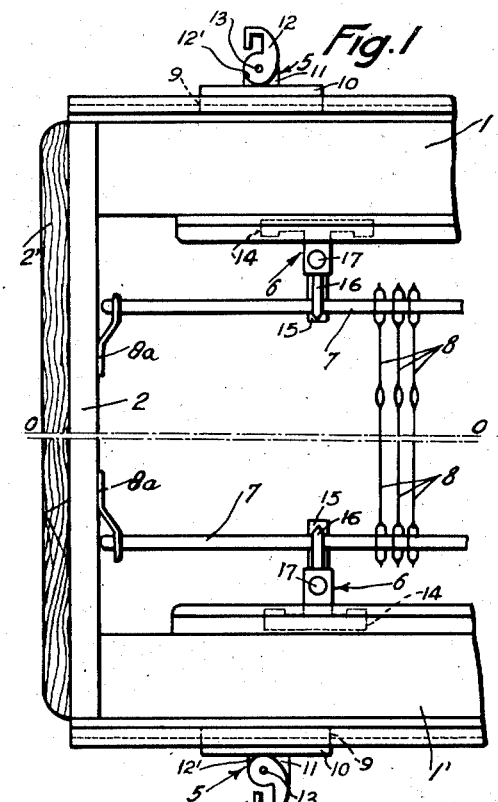
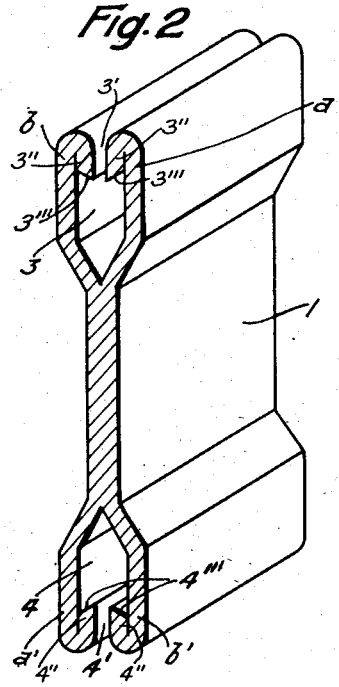
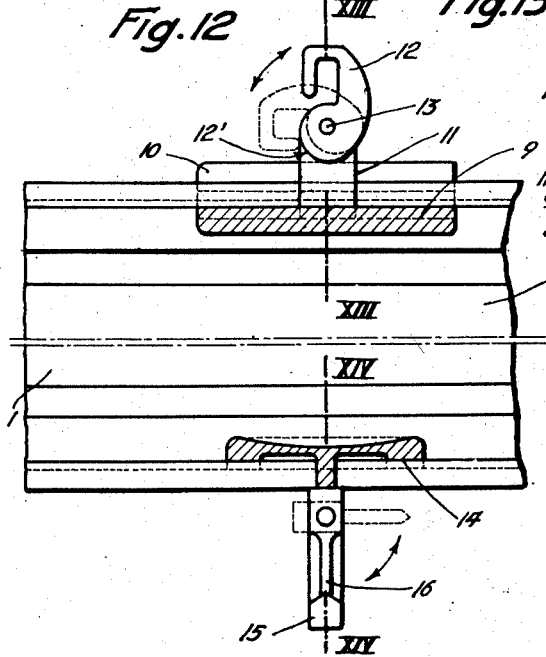
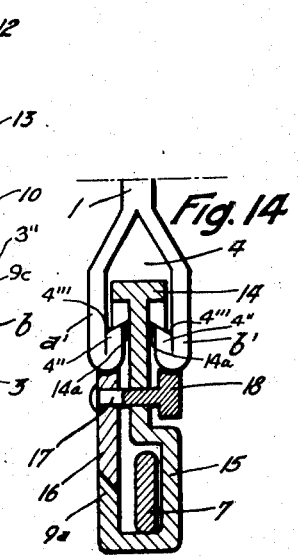
INVENTOR
RODOLPHE CHRISTIAN HAENNY
ALSO KNOWN AS
RODOLF CHRISTIAN HÄNNI
AGENT July 14, 1953  RODOLPHE CHRISTIAN HAENNY  2,645,251
ALSO KNOWN AS
RODOLF CHRISTIAN HÄNNI
HARNESS FRAME FOR LOOMS
Filed Feb. 21, 1948  5 Sheets-Sheet 2
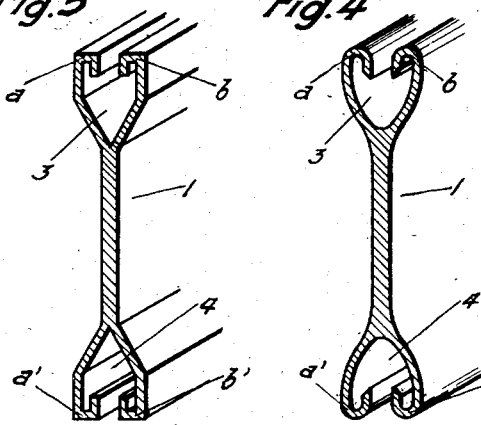
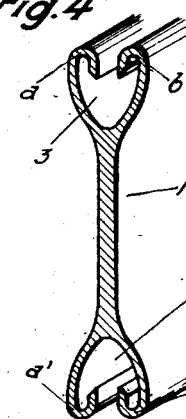
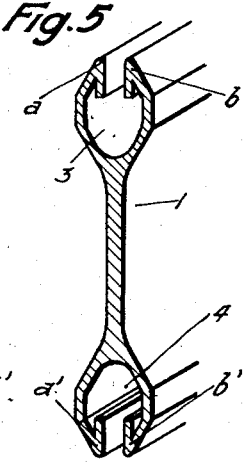
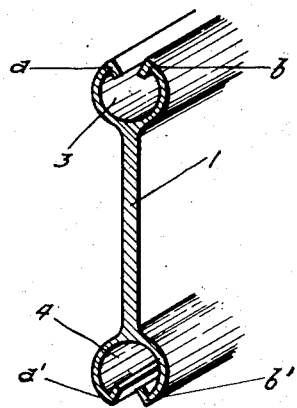
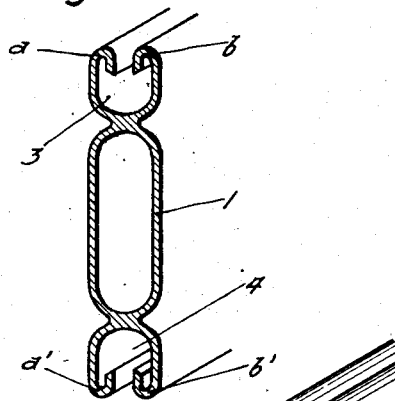
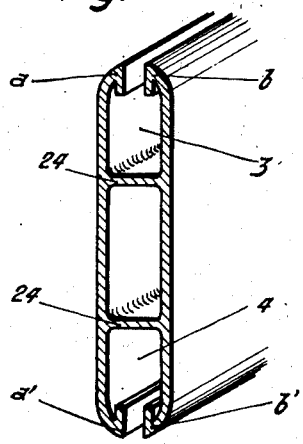
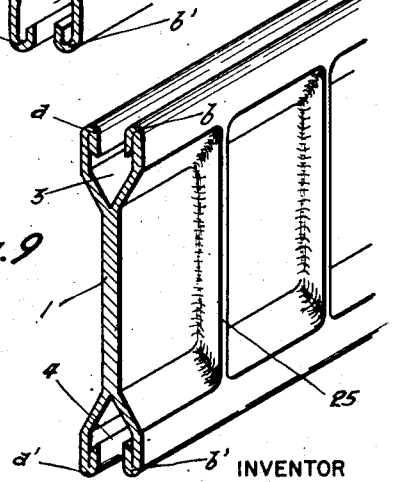
INVENTOR
RODOLPHE CHRISTIAN HAENNY
ALSO KNOWN AS
RODOLF CHRISTIAN HÄNNI
AGENT

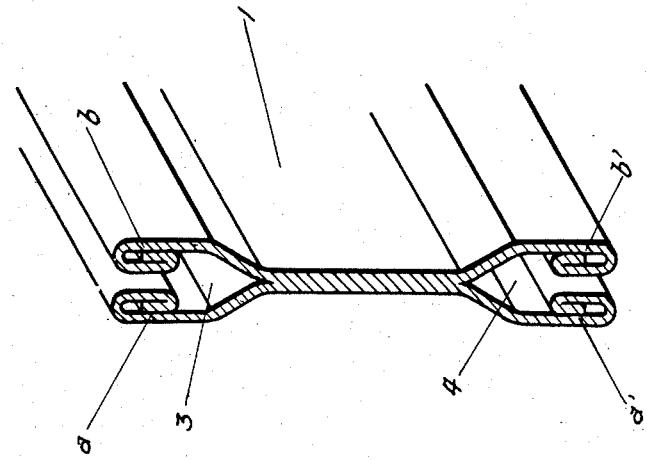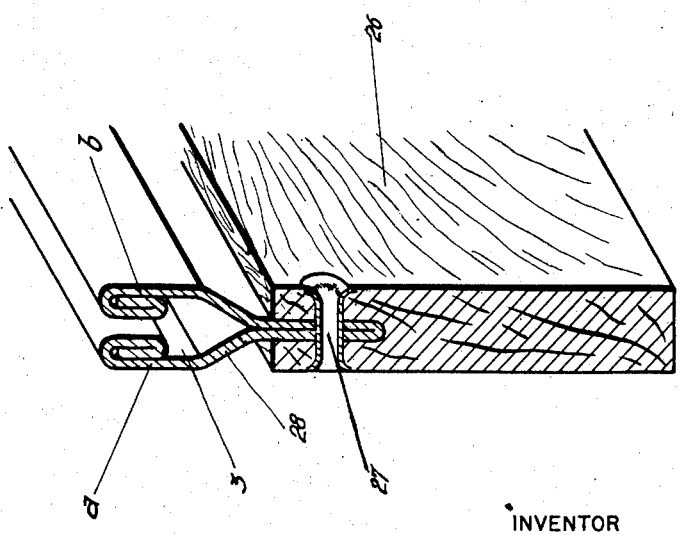

July 14, 1953 RODOLPHE CHRISTIAN HAENNY 2,645,251
ALSO KNOWN AS
RODOLF CHRISTIAN HÄNNI
HARNESS FRAME FOR LOOMS
Filed Feb. 21, 1948 5 Sheets-Sheet 4
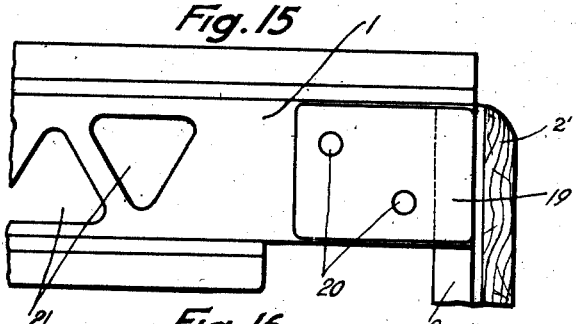
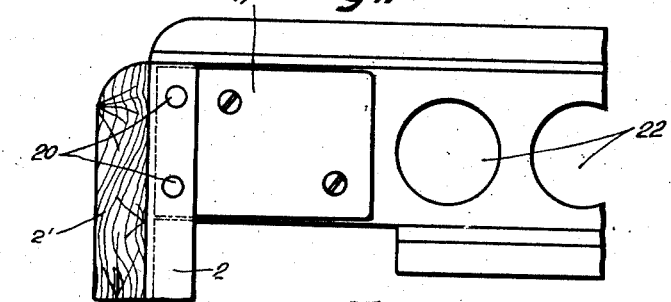
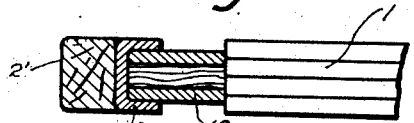
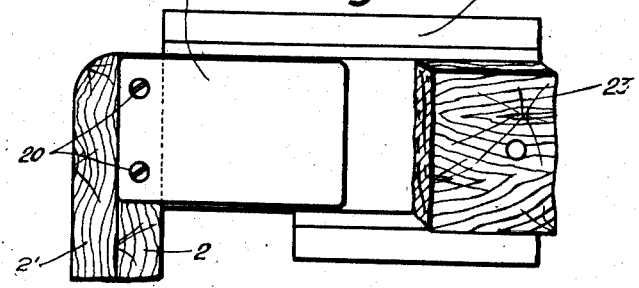
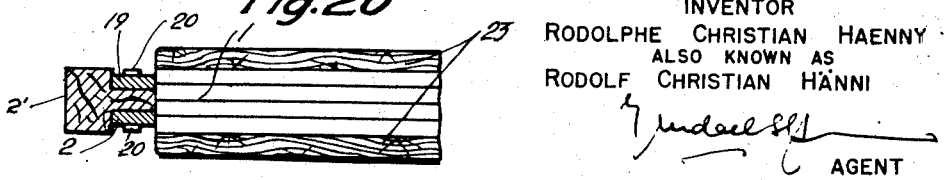
INVENTOR
RODOLPHE CHRISTIAN HAENNY
ALSO KNOWN AS
RODOLF CHRISTIAN HÄNNI
AGENT

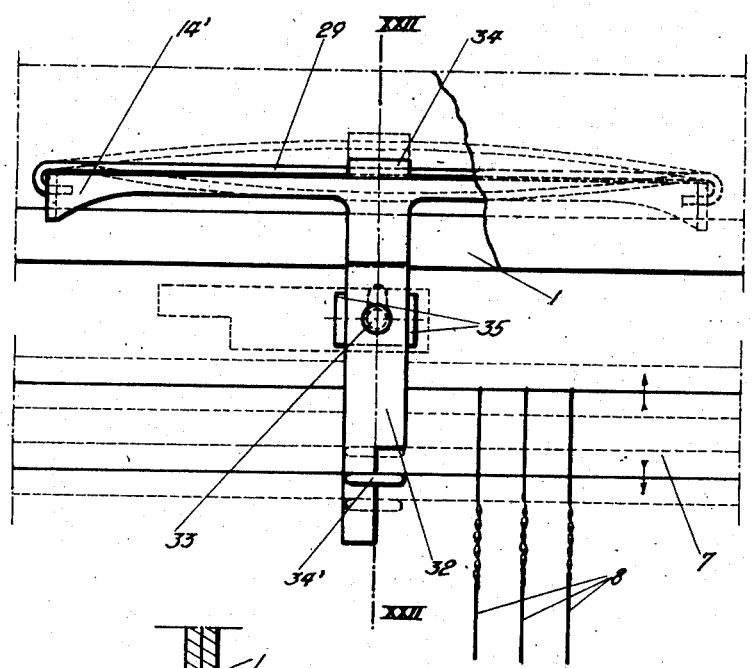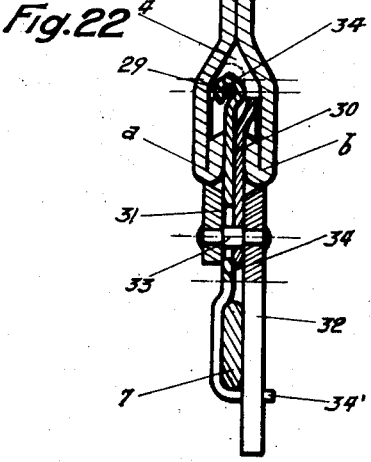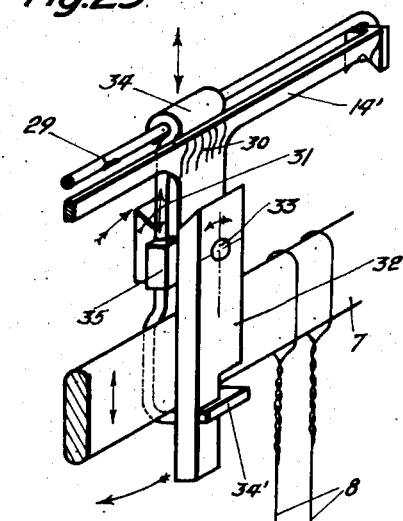

Patented July 14, 1953

2,645,251

UNITED STATES PATENT OFFICE 2,645,251

HARNESS FRAME FOR LOOMS

Rodolphe Christian Haenny, also known as Rodolf Christian Hänni, Zurich, Switzerland, assignor to Philippe Meyer, Paris, France Application February 21, 1948, Serial No. 10,158
In France July 19, 1946

Section 1, Public Law 690, August 8, 1946
Patent expires July 19, 1966

9 Claims. (Cl. 139—92)

The present invention has for its main object to provide a heddle frame that is light, strong, reasonable in cost and simple to manufacture, being characterized in particular by the fact that the cross-beams (on which are hooked the heddle bar carriers) are formed by sections having a full web and of which at least one of the longitudinal upper and lower edges comprises slide guides for the heddle bar carriers and possibly for the harness supporting units that may move inside each cross beam and be locked in the latter at selected points.

The slide guides for the harness supporting hook units and for the heddle bar carriers preferably include longitudinal flutings or slots, extending along the upper and lower edges of the cross-beam involved.

Each cross-beam end is removably connected with the corresponding lateral upright of the frame by means of a removable assembly plate.

The hook units are locked in their guide slots, when in suspended position, and are released, when brought to pivot into a horizontal position, and each of the hook units comprises to this end a part having the shape of a cam and acting on a jaw that works together with a shoe sliding in the slot, so as to clamp the edges of said guide slot of the cross-beam.

Each heddle bar carrier has the shape of a closed hook provided with a pivoting element which makes it possible, on the one hand, to engage or to remove the carrier and, on the other hand, to unlock and to slide said carrier (with the hook in open position) in the guide slot of the beam and to lock said carrier (with the hook in closed position) in the slot concerned, at a suitable point, while the pivoting part of the heddle bar carrier forms a clamping jaw working together with a shoe (the latter sliding in the guide slot) so as to clamp the edges of said slot.

According to an improved embodiment, the heddle bar carrier is made up so as to allow a certain vertical movement of the shaft, and this carrier, with a view to said movement, comprises a yielding member (such as a metallic wire) which is fastened, on the one hand, on the slide block of the carrier and, on the other hand, to the hook proper of the heddle bar carrier.

Other particularities and salient features of the new heddle frame will appear more clearly in the following description which relates to some non-limiting forms of the invention merely presented as examples illustrated in the accompanying drawings in which:

Fig. 1 is a partial elevation view of a heddle frame made in accordance with the invention.

Fig. 2 is a perspective view, on a larger scale, of a part of the cross-beam of the heddle frame of Fig. 1.

Figs. 3, 4, 5, 6, 7, 8, 9 and 10 are views, similar to Fig. 2, of various modiled embodiments of the cross-beam.

Fig. 11 is a perspective view of the upper half part of another embodiment of the cross-beam.

Fig. 12 is an elevation view which illustrates a part of the upper cross-beam of the heddle frame, together with a harness supporting hook unit and a heddle bar carrier.

Fig. 13 is a cross-section on a larger scale of the harness supporting hook unit of the heddle frame along line XIII—XIII of Fig. 12.

Fig. 14 is a cross-section similar to the preceding one of the heddle bar carrier but taken along line XIV—XIV of Fig. 12.

Figs. 15 and 16 are respectively, an elevation and a plan view of a perforated cross-beam and of its bracing to one of the lateral uprights.

Figs. 17 and 18 on the one hand, and 19 and 20 on the other hand, are views of two other modifications corresponding to those illustrated in Figs. 15 and 16.

Fig. 21 is an elevation view, partly broken, of a yielding heddle bar carrier.

Fig. 22 is a cross-sectional view along line XXII—XXII of Fig. 21.

Fig. 23 is a perspective view of a yielding heddle bar carrier of Figs. 21 and 22.

Referring now to the embodiment of the invention of Figs. 1, 2, 12, 13 and 14, it will be seen that the heddle frame comprises a frame proper that includes two cross-beams 1 and 1' and two lateral uprights 2 with their slide 2', only one of these uprights being apparent in the drawing. The upper and lower frame parts are substantially symmetrical with reference to line 0—0 of Fig. 1, and for this reason only one of the frame parts will therefore be described, namely the upper part, since it is well understood that the opposite part is arranged in a similar manner but in the reverse position.

The cross-beam 1 is formed, in the example concerned, by a channel section having at its upper and lower longitudinal edges grooves 3 and 4 of suitable shape that may be symmetrical or not; slot 3 making it possible for the harness supporting hook units 5 to slide while slot 4 facilitates sliding of the heddle bar carrier 6 of which the hook proper carries one of the heddle bars 7 intended to bear the heddles 8 of the frame, and these heddle bars are held fast, but for a certain play in the vertical direction, by lateral guides 8a which are secured to the inner side of the lateral uprights 2.

Grooves 3 and 4 are formed by the elongated forked portions a—b and a'—b' of the cross-beam 1 respectively, and these forked portions have their rims bent to themselves toward the inside of the slots so as to serve as guide rails and to define narrowed portions of the grooves 3' and 4' serving as guide slots, while the upper edges of the guide rails 3'' and 4'' serve as guide ways for the harness supporting units, and the heddle bar carriers.

In the preferred embodiment illustrated in Figs. 1 and 2, the upper edges 3''', 4''' of the guide rails 3'', 4'' are inclined.

Slot 3', as it has been seen, serves for guiding a harness supporting hook unit 5 comprising a slide block 9 housed in said groove 3 and having inclined face portions 9c that come into contact with the corresponding guide ways of the guide rails. At the outside of the slot is located a clamping jaw 10 which works together with the outer surfaces of the inwardly bent forked portions a and b and comes into engagement with a tail member 11 integral with block 9 and carrying a hook proper 12 which pivots about a pin 13; said hook includes a part 12' having the shape of a cam and conditioned, when the hook is in the upright position (suspended position as illustrated in full lines in the drawing), to exert a pressure on jaw 10 and, by reaction transmitted to block 9, to cause clamping of the assembly unit 9—10 against the guide rails of the forked portions a—b of the beam 1. In this position is locked the whole of the supporting hook unit, at a point whatever along the cross-beam and chosen at will. If the hook unit 5 is to be unlocked and permitted to slide in the guide slot, it is sufficient to bring the hook proper 12 to pivot and thus into the position illustrated in dotted lines in Fig. 12.

The heddle bar carrier 6 comprises a slide block 14 which slides in slot 4 and is provided with inclined face portions (see Figs. 12 and 14) bearing against the inwardly curved rims of the sections which demarcate said slot, while its intermediate part, slightly acting as a spring, carries a rod 15 curved so as to form a housing in which may fit the heddle bar. This housing is closed by a pivoted clamping member 16 to which is secured a crossing pin 17 turnably mounted in rod 15 which is in its turn integral with a clamping latch member 18 which together with the member 16 forms a single latch 18 so that members 16, 17 and 18 constitute latch means. The upper surfaces of members 16 and 18 are propped (with the latch in closed position) against the outer sides of the inwardly bent forked portions a' and b' of the beam 1. It will be readily understood that with the heddle bar housing closed the locking device 16—18 and the yielding sliding block 14 form a clamping jaw unit that engages the guide rails of the cross beam 1 and locks the heddle bar carrier concerned at a point chosen at will along said cross-beam.

The cross-beams 1 may be removably connected to the uprights 2 by means of detachable plates 19 which are fastened by screws 20, as apparent in Figs. 15 to 20, or by any other means, such as riveting, welding, etc. The uprights may display any cross-section whatever: T section (Fig. 16); U section (Fig. 18), I beam section, etc., and they may also be formed from metal or wood (Figs. 19 and 20).

The cross-beams may individually comprise a single piece (Figs. 2, 10, or 13, 14) which may show clearances or hollowed out spaces of various shapes 21 (Fig. 15) and 22 (Fig. 17) for lightening these pieces. If needed, the lateral surfaces of the cross-beams may be covered with stiffening plates 23, made of wood or any other material (Figs. 19 and 20). Furthermore, these parts may have various cross-sections, as those illustrated, for instance in Figs. 3 to 11. In Fig. 3 the beam is provided on each side of the guide slots 3 and 4 with angular rims and vertical sliding areas (thus not sloping). In Fig. 4 the upper and lower surfaces of the beam are round shaped and the sliding areas are sloping. In Fig. 5 the sides of the sections are chamfered. In Fig. 6 the sides are rounded off with the inner rims slanting. In Figs. 7 and 8, the beam web has a hollow cross-section of closed outline. In the embodiment shown in Fig. 8, the beam web is provided with stiffening brace ribs 24. In Fig. 9, the beam web is reinforced by vertical stiffening ribs 25. In Fig. 10 the rims of the sections a—b and a'—b' are folded up twice. In the embodiment shown in Fig. 11 the cross-beam includes a web 26 made of wood, for instance, and provided with flutings on their longitudinal edges inside which are secured, by rivets 27 for instance, channel sections 28 with their guide slots 3 and 4. The Fig. 11 shows only the upper half part of the cross-beam.

Figs. 21 and 23 refer to a heddle bar carrier the hooked part of which is adapted to carry out a slight reciprocating movement in the vertical direction, intended to provide for the swinging of heddle bars 7 (and heddles 8) during weaving.

In this embodiment, the heddle bar carrier is provided with a flexible steel wire 29 that is bent at its ends and anchored in the bores provided for this purpose in the end parts or shoes of the slide block 14'. The medial part of the slide block 14' forms one piece with a rod 30 of the heddle bar carrier, to which rod are hinged two blocks 31 and 32 of the pivoting latch used for locking the heddle bar carrier on cross-beam 1, and these blocks are secured to a linking pin 33 that rigidly interconnects these blocks. The steel wire 29 fits at its middle part in the upper end of a sliding blade 34 having a bore through which pin 33 extends loosely and this blade may move freely in the vertical direction between the members 30 and 31. The lower end of blade 34 is shaped so as to form a hook 34' into which may engage and slide, if in closed position, the lower part of block 32 of the locking system 31—32 and this block demarcates with the help of the lower end of blade 34, a housing for heddle bar 7.

The sliding blade 34 (the lower part of which is connected to the heddle bar) is yieldingly connected to the slide block 14', said blade and heddle bar 7, together with heddles 8 may yieldingly swing in vertical direction, with respect to the heddle frame proper; but any lateral shift of said blade 34, that is to say any displacement parallel to the cross beam 1, is prevented by guide checks 35 carried by rod 30.

It will be clearly understood that the forms of the new heddle frame which have been described hereinabove and illustrated in the accompanying drawings are set forth as a guide only and in a non-limiting sense. Manifestly, variations may thus be resorted to, and parts and features may be modified or used without others within the scope of the appended claims.

What I claim is:

1. In a heddle frame comprising a lateral upright on each frame side, in combination, two cross beams having each end thereof secured to the uprights, each of said cross beams integrally made of one piece and having a full web, and at least the longitudinal edge of said cross beam inside the frame forked into a pair of elongated portions enclosing a groove, the elongated end portions of said pair of elongated portions being bent to themselves inwardly extending vertically for a distance greater than the thickness of said elongated end portions and abutting laterally against the remainder of said elongated portions so as to form a pair of guide rails inside said groove, said pair of guide rails defining a narrowed portion of said groove serving as a guide slot and having substantially horizontal narrow edges located inside said groove serving as guide ways; two heddle bars; heddle bar carriers for connecting said heddle bars to said cross beams shaped so as to be guided in said guide slot and provided with face portions adapted for sliding on said guide ways; and heddles connected to said heddle bars.

2. In a heddle frame comprising a lateral upright on each frame side, in combination, two cross beams having each end thereof secured to the uprights, each of said cross beams integrally made of one piece and having a full web, and at least the longitudinal edge of said cross beam inside the frame forked into a pair of elongated portions enclosing a groove, the elongated end portions of said pair of elongated portions being bent to themselves inwardly extending vertically for a short distance so as to form a pair of guide rails inside said groove, said pair of guide rails defining a narrowed portion of said groove serving as a guide slot, and having inclined edges serving as guide ways; two heddle bars; heddle bar carriers for connecting said heddle bars to said cross beams shaped so as to be guided in said guide slot and provided with inclined face portions adapted for sliding on said guide ways; and heddles connected to said heddle bars.

3. In a heddle frame comprising a lateral upright on each frame side, in combination, two cross beams having each end thereof secured to the uprights; two heddle bars; heddle bar carriers for connecting said heddle bars to said cross beams; and heddles connected to said heddle bars; each of said cross beams integrally made of one piece and having a full web, and at least the longitudinal edge of said cross beam inside the frame forked into a pair of elongated portions enclosing a groove, the elongated end portions of said pair of elongated portions being bent to themselves inwardly extending vertically for a short distance so as to form a pair of guide rails inside said groove, said pair of guide rails defining a narrowed portion of said groove serving as a guide slot for said heddle bar carriers, and having edges serving as guide ways for said heddle bar carriers, each heddle bar carrier including a slide block having face portions adapted for sliding on said guide ways, a rod integral with said slide block passing through and projecting out of said guide slot and having the projecting end portion hook-shaped thereby defining a housing for receiving said heddle bar, latch means pivotally supported in said housing and including a clamping member disposed on one side of said rod and adapted to bear against one of said pair of guide rails, a pin turnably supported in said rod and projecting from the other side thereof, and a clamping block secured to said pin on the projecting end portion thereof adapted to bear against the other of said pair of guide rails so that said heddle bar carrier is locked to said cross beam when said guide rails are clamped between said sliding block on one hand, and between said clamping block and said clamping member on the other hand in one position of said latch means, and released when said latch means are turned in another position.

4. In a heddle frame comprising a lateral upright on each frame side, in combination, two cross beams having each end thereof secured to the uprights, each of said cross beams integrally made of one piece and having a full web, and each of its two longitudinal edges forked into a pair of elongated portions enclosing a groove, whereby on each cross beam an outer groove is formed at the outside of the frame and an inner groove at the inside of the frame, the end portions of each pair of elongated portions being bent to themselves inwardly extending vertically for a distance greater than the thickness of said elongated end portions and abutting laterally against the remainder of said elongated portions so as to form a pair of guide rails inside each of said grooves, the pair of guide rails inside said outer groove defining a narrowed portion of said outer groove serving as a guide slot and having substantially horizontal narrow edges serving as guide ways; two heddle bars; heddle bar carriers for connecting said heddle bars to said cross beams; heddles connected to said heddle bars; and harness supporting units shaped so as to be guided in said guide slot and provided with face portions adapted for sliding on said guide ways.

5. In a heddle frame comprising a lateral upright on each frame side, in combination, two cross beams having each end thereof secured to the uprights, each of said cross beams integrally made of one piece and having a full web, and each of its two longitudinal edges forked into a pair of elongated portions enclosing a groove, whereby on each cross beam an outer groove is formed at the outside of the frame and an inner groove at the inside of the frame, the end portions of each pair of elongated portions being bent to themselves inwardly extending vertically for a short distance so as to form a pair of guide rails inside each of said grooves, the pair of guide rails inside said outer groove defining a narrowed portion of said outer groove serving as a guide slot and having inclined edges serving as guide ways; two heddle bars; heddle bar carriers for connecting said heddle bars to said cross beams; heddles connected to said heddle bars; and harness supporting units shaped so as to be guided in said guide slot and provided with inclined face portions adapted for sliding on said guide ways.

6. In a heddle frame comprising a lateral upright on each frame side, in combination, two cross beams having each end thereof secured to the uprights; two heddle bars; heddle bar carriers for connecting said heddle bars to said cross beams; and heddles connected to said heddle bars; harness supporting units slidingly secured to said cross beam; each of said cross beams integrally made of one piece and having a full web, and each of its two longitudinal edges forked into a pair of elongated portions enclosing a groove, whereby on each cross beam an outer groove is formed at the outside of the frame and an inner groove at the inside of the frame, the end portions of each pair of elongated portions being bent to themselves inwardly extending vertically for a short distance so as to form a pair of guide rails inside each of said grooves, the pair of guide rails inside said outer groove defining a narrowed portion of said outer groove serving as a guide slot for said harness supporting units and having edges serving as guide ways for said harness supporting units, each of said harness supporting units including a block slidingly movable on said guide ways in said outer groove; a tail piece integral with said block passing through and projecting out of said guide slot, a clamping jaw secured to said tail piece and adapted to bear against the outer edges of said pair of guide rails, a pin passing through a hole in said tail piece, a hook member pivotally secured to said pin having cam shaped portions adapted to press said clamping jaw against the outer edges of said elongated portions, and to simultaneously press said sliding block against said guide ways by means of said pin when said hook member is in upright position.

7. In a heddle frame comprising a lateral upright on each frame side, in combination, two cross beams having each end thereof secured to the uprights; two heddle bars; heddle bar carriers provided with slide faces for connecting said heddle bars to said cross beams; and heddles connected to said heddle bars; each of said cross beams integrally made of one piece and having a full web, and at least the longitudinal edge of said cross beam inside the frame forked into a pair of elongated portions enclosing a groove, the lateral ends of said elongated portions being spaced from the uprights for insertion of said heddle bar carriers and the elongated end portions of said pair of elongated portions being bent to themselves inwardly extending vertically for a distance greater than the thickness of said elongated end portions and abutting laterally against the remainder of said elongated portions so as to form a pair of guide rails inside said groove, said pair of guide rails defining a narrowed portion of said groove serving as a guide slot for said heddle bar carriers, and having substantially horizontal narrow edges serving as guide ways for said slide faces of said heddle bar carriers.

8. In a heddle frame comprising a lateral upright on each frame side, in combination, two cross beams having each end thereof secured to the uprights, each of said cross beams integrally made of one piece and having a full web, and at least the longitudinal edge of said cross beam inside the frame forked into a pair of elongated portions enclosing a groove, the elongated end portions of said pair of elongated portions being bent to themselves inwardly extending vertically for a short distance so as to form a pair of guide rails inside said groove, said pair of guide rails defining a narrowed portion of said groove serving as a guide slot, and having edges located inside said groove serving as guide ways; two heddle bars; heddle bar carriers for connecting said heddle bars to said cross beams, each heddle bar carrier extending through said guide slot and having face portions adapted for sliding on said guide ways and including pivotable latch means adapted to bear on the outer edges of said guide rails and to clamp said heddle bar carriers to said guide rails of said cross beams in one position, and to release said guide rails in another position.

9. In a heddle frame comprising a lateral upright on each frame side, in combination, two cross beams having each end thereof secured to the uprights, each of said cross beams integrally made of one piece and having a full web and each of its two longitudinal edges forked into a pair of elongated portions enclosing a groove, whereby on each cross beam an outer groove is formed at the outside of the frame and an inner groove at the inside of the frame, the end portions of each pair of elongated portions being bent to themselves inwardly extending vertically for a short distance so as to form a pair of guide rails inside each of said grooves, the pair of guide rails inside said outer groove defining a narrowed portion of said outer groove serving as a guide slot and having edges serving as guide ways; two heddle bars; heddle bar carriers for connecting said heddle bars to said cross beams; and harness supporting units, each of said harness supporting units extending through said guide slots and having face portions adapted for sliding on said guide ways and including a clamping jaw adapted to bear against the outer edges of said guide rails and a pivoted hook member having cam-shaped portions and in upright position adapted to clamp said guide rails between said clamping jaw and said sliding block.

RODOLPHE C. HAENNY,
*Also known as Rodolf C. Hänni.*

References Cited in the file of this patent

UNITED STATES PATENTS

| Number | Name | Date |
|---|---|---|
| 729,047 | Draper | May 26, 1903 |
| 954,013 | Barlow | Apr. 5, 1910 |
| 1,434,189 | Bennett | Oct. 31, 1922 |
| 1,866,908 | Robertson | July 12, 1932 |
| 1,887,326 | Ragan | Nov. 8, 1932 |
| 2,082,480 | Carr | June 1, 1937 |
| 2,461,497 | Kaufmann | Feb. 8, 1949 |
| 2,482,149 | Blickenstorfer | Sept. 20, 1949 |

FOREIGN PATENTS

| Number | Country | Date |
|---|---|---|
| 155,094 | Switzerland | Nov. 16, 1932 |
| 211,902 | Switzerland | Jan. 2, 1941 |
| 417,004 | Great Britain | Sept. 26, 1934 |
| 846,983 | France | June 19, 1939 |